United States Patent
Coleman et al.

[11] Patent Number: 6,139,393
[45] Date of Patent: Oct. 31, 2000

[54] FLUTE AND CANDY DEVICE

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/261,738

[22] Filed: Mar. 3, 1999

[51] Int. Cl.[7] .................................................. A63H 5/00
[52] U.S. Cl. ........................ 446/75; 446/81; 446/196; 446/206; 426/104
[58] Field of Search .................. 446/75, 76, 77, 446/81, 192, 196, 202, 204, 205, 206, 213, 216; 426/104

[56] References Cited

U.S. PATENT DOCUMENTS

| | | |
|---|---|---|
| 405,868 | 6/1889 | Bernardin . |
| 603,555 | 5/1898 | Davis . |
| 894,512 | 7/1908 | Johr ............................................ 446/81 |
| 1,765,646 | 6/1930 | Bauer ......................................... 446/76 |
| 1,930,504 | 10/1933 | Benjafield ............................... 446/204 |
| 2,417,480 | 3/1947 | Freidman . |
| 2,490,368 | 12/1949 | Millstein ................................... 446/76 |
| 2,529,661 | 11/1950 | Millstein . |
| 2,590,476 | 3/1952 | Stough ...................................... 446/76 |
| 2,617,324 | 11/1952 | Brody . |
| 2,730,920 | 1/1956 | Bacon ..................................... 446/205 |
| 2,739,065 | 3/1956 | Hugin . |
| 2,882,170 | 4/1959 | Stewart . |
| 3,138,249 | 6/1964 | Paulini . |
| 3,924,560 | 12/1975 | Kaftan .................................... 446/204 |

Primary Examiner—Kien T. Nguyen
Assistant Examiner—Jeffrey D. Carlson
Attorney, Agent, or Firm—Melvin L. Crane

[57] ABSTRACT

A combination whistle and candy/gum holding device. The device is provided with a central hollow shaft which is surrounded by a cylindrical housing. A whistle is attached to one end and a slide piston is slidable in the hollow shaft so that different sounds can be made by blowing into the whistle while moving the piston. Candy in the surrounding housing can be dispensed as desired by a consumer.

9 Claims, 2 Drawing Sheets

FLUTE AND CANDY DEVICE

BACKGROUND OF THE INVENTION

This invention is directed to a flute or whistle in combination with a container for candy gum or any other edible product.

1. Field of the Invention

Heretofore various types of toy whistles or flutes have been made for the enjoyment of a child or any other person.

2. Description of the Related Prior Art

Heretofore various designed toy whistles have been patented which provide different types of whistle and/or in combination with a related toy for amusement of a person. U.S. Pat. No. 405,868 sets forth a whistle in combination with a small rotatable wheel at the wind outlet of the whistle. U.S. Pat. No. 603,555 sets forth a whistle which is provided with a removable plunger which enables one to provide different sounds by movement of the plunger. U.S. Pat. No. 2,617,324 sets forth a combination confection and whistle. The confection is adhered to one end of the whistle which functions as a holder. The whistle is provided with apertures 19 at one end which is covered by the confection. As the confection is consumed from the outer end, the apertures 19 are uncovered in succession to make different whistle sounds as the apertures are uncovered. U.S. Pat. No. 2,739,065 relates to an edible whistle candy product. The device functions as a whistle and after using it as a whistle, the device can be eaten, or chewed, depending on the material from which the whistle is made.

SUMMARY OF THE INVENTION

The whistle-candy combination is made like a whistle with an elongated tubular body in which a piston is slidable along the tubular body by a slide shaft so that different sounds can be made. A transparent housing surrounds the tubular body and contains small pieces of candy, gum or any other desired edible product which will fit into the housing. The housing is provided with a removable cap so that candy can be added or removed from the housing.

It is therefore an object of the invention to provide a combination whistle and edible product dispenser for the enjoyment and pleasure of a person.

Another object is to provide a whistle and edible product device in which different sounds can be produced.

Still another object is to provide a whistle and edible product container which can be used over and over for different edible products.

Other objects and advantages of the invention will become obvious to those skilled in the art upon viewing the drawings and disclosure.

DETAILED DESCRIPTION

Figure 1:
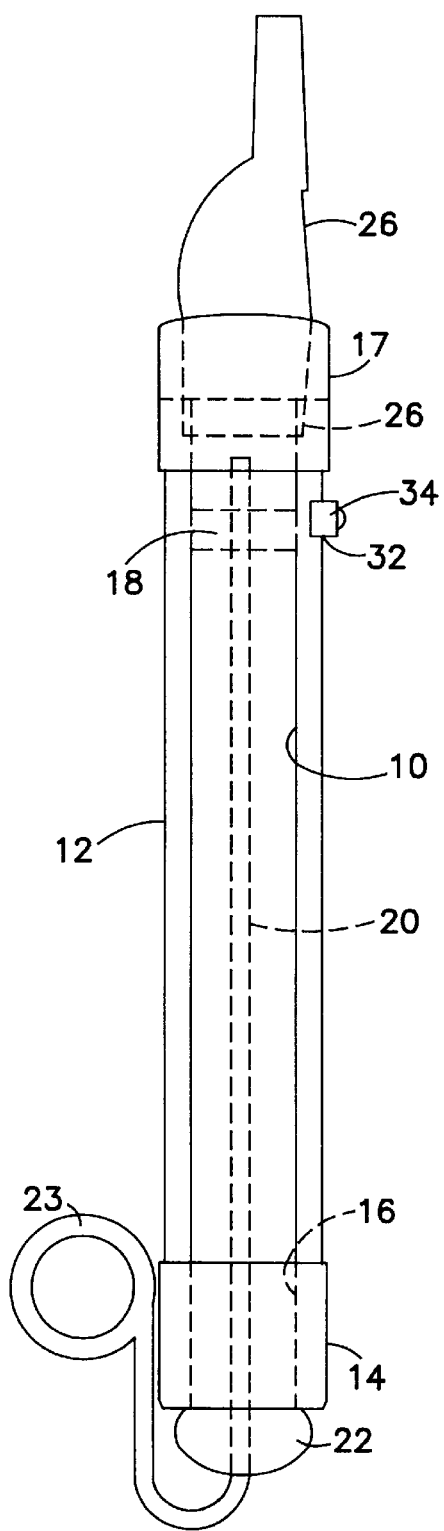
FIG. 1 is a side view illustrating the various parts of the device without an edible product.
Figure 2:
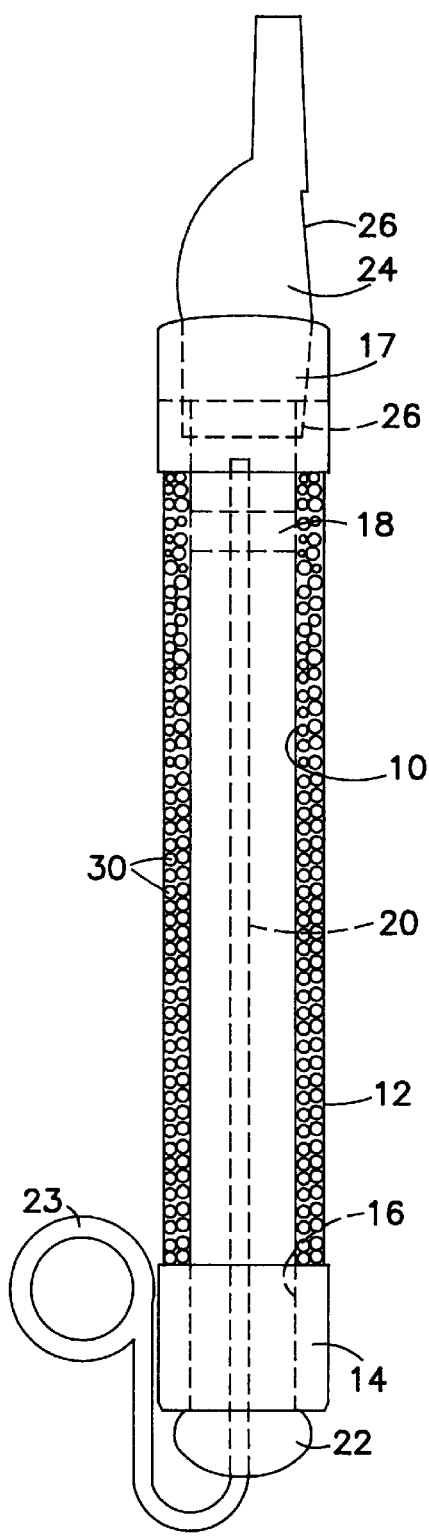
FIG. 2 is a side view illustrating a somewhat cross-sectional view of the edible product.
Figure 3:
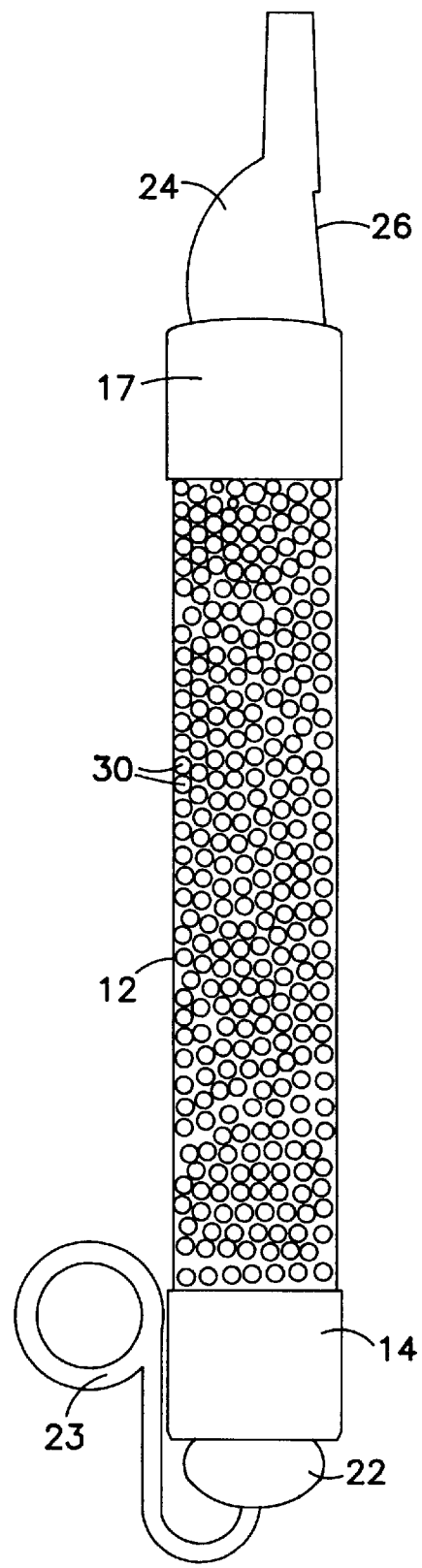
FIG. 3 illustrates a side view of the device illustrating the housing full of an edible product.

Now referring to the drawings, there is shown three different views of the device. The parts are preferably made of transparent plastic so the various parts can be seen when viewing the device. As shown in FIG. 1, the device includes an inner hollow cylindrical shaft 10 which is surrounded by a housing 12. The housing 12 is closed at the lower end by a fixed cylindrical end cap 14 which closes the spacing between the shaft 10 and the housing. The central portion of the end cap forms an aperture 16 which is the same diameter as the shaft. The upper end of the housing is closed by a removable end cap 17 which closes off the housing at the upper end. The hollow shaft 10 forms a sound chamber which includes therein a piston 18, which is slidable along the hollow shaft by a rod 20 secured at one end to the piston 18. The rod extends axially along the housing through an end plug 22 which seals the end of the hollow shaft. The rod 20 is guided by the end plug and can be removed outwards by a finger grip 23 until the piston 18 is stopped by the plug 22. The upper end of the device is provided with a whistle 24 which is secured at its inner end 26 to the hollow shaft 10. The whistle is of a known construction including an inner passage which meets with the hollow shaft and is provided with an opening 26 of a well known shape which is not visible in the drawings.

In order to fill the housing with candy or gum pieces 30, as shown, the end cap and whistle are removed from the housing and the pieces of candy or gum are added to the area bounded by the housing. Once the candy or gum pieces have been added to the housing, the inner end cap and whistle are replaced by a direct connection with the hollow shaft and housing, respectfully. When a user desires a piece of candy or gum, the whistle and upper removable cap are removed and the candy or gum can be dispensed from the housing. Once the pieces of gum or candy have been dispensed the removable cap and whistle are replaced. The term candy or gum pieces have been used above, obviously any product with small pieces or a powder could be added to the housing.

For an added expense, the housing could be provided with an aperture 32 through which the candy or gum can be dispensed. The aperture could be provided with a movable covering or could have a plug 34 which fits into the aperture. This way the candy can be removed without removing the removable cap. The aperture could be used for filling the housing also. Such an aperture and plug has been shown in FIG. 1, which presents the clearer structure.

In use one blows into the whistle which will provide a sound as the air passes through the opening 26. The sound can be changed by moving the slidable piston in the hollow shaft via the piston shaft. Variable sounds can be made by moving the piston in and out. With the present device, one can enjoy a whistle sound and have available pieces of candy or gum.

We claim:

1. A novelty toy which comprises:

a hollow, cylindrical, elongated shaft (10), a housing (12) surrounding and enclosing said shaft with a spacing between said shaft and said housing, a fixed end cap (14) at a first end of said housing which closes off said spacing between said housing and said shaft, a removable cap (17) at a second end of said housing which upon removal of said removable cap (17) an edible product can be added to the spacing between said housing and said shaft and dispensed from said housing upon removal of said removable end cap (17), and a whistle secured to an end of said shaft (10) at said second end of said housing.

2. A novelty toy as set forth in claim 1, which includes:

a movable piston in said shaft, and means for moving said piston axially along said shaft, in order to make different sounds from said whistle as the piston is moved along the shaft.

3. A novelty toy as set forth in claim 2, in which said shaft includes a separate closure means (22) secured to an end of said shaft at said first end of said housing which functions as a guide for said means for moving said piston axially.

4. A novelty toy as set forth in claim 1, in which said edible product is candy.

5. A novelty toy which comprises:

a hollow, cylindrical elongated shaft (10), a cylindrical housing surrounding and enclosing said shaft with a spacing between the housing and the shaft, a fixed cap (14) at a first end of said housing which closes off the spacing between said housing and said shaft, a removable cap (17) at a second end of said housing which upon removal of said removable cap (17) an edible product can be added to the spacing between said housing and said shaft and/or dispensed from said housing, an aperture (32) in a side of said housing through which an edible product can be added to and dispensed from said housing, a plug (34) for closing said aperture (32), and a whistle at the second end of said housing, said whistle is secured by an end to an end of said shaft.

6. A novelty toy as set forth in claim 5, which includes:

a movable piston in said shaft, and means for moving said piston axially along said shaft, in order to make different sounds from said whistle as said piston is moved along said shaft.

7. A novelty toy as set forth in claim 5, in which said shaft includes a separate closure means at said first end of said housing.

8. A novelty toy as set forth in claim 6, in which said shaft includes a separate closure means at said first end of said housing.

9. A novelty toy as set forth in claim 5, in which said edible product is candy.

\* \* \* \* \*